United States Patent [19]

Konrad et al.

[11] Patent Number: 5,052,724
[45] Date of Patent: Oct. 1, 1991

[54] THREADED SWIVEL CONNECTOR

[75] Inventors: Mathias Konrad, Lohmar; Arnold Barth, Siegburg, both of Fed. Rep. of Germany

[73] Assignee: Jean Walterscheid GmbH

[21] Appl. No.: 490,145

[22] Filed: Mar. 7, 1990

[30] Foreign Application Priority Data

Mar. 22, 1989 [DE] Fed. Rep. of Germany ....... 3909424

[51] Int. Cl.$^5$ .............................................. F16L 41/08
[52] U.S. Cl. ................................... 285/190; 285/281; 285/917
[58] Field of Search ............... 285/190, 122, 123, 281, 285/328, 917; 277/188 A, 209, 211, 207 R; 411/187, 188, 189

[56] References Cited

U.S. PATENT DOCUMENTS

| 2,307,328 | 1/1943 | Martin | 285/190 |
| 3,315,988 | 4/1967 | Schroter | 285/190 |
| 4,223,711 | 9/1980 | Tabor | 411/188 |
| 4,448,429 | 5/1984 | Thomas | 277/209 |
| 4,807,514 | 2/1989 | Gartzmuller | 277/209 X |

FOREIGN PATENT DOCUMENTS

| 1933916 | 9/1965 | Fed. Rep. of Germany. |
| 1485826 | 9/1977 | Fed. Rep. of Germany. |
| 2837977 | 3/1980 | Fed. Rep. of Germany ...... 285/190 |
| 3418558 | 11/1985 | Fed. Rep. of Germany. |
| 3546291 | 10/1986 | Fed. Rep. of Germany. |

OTHER PUBLICATIONS

Catalog of the firm Emeto Arramaturen GmbH, 1982, pp. title, D2, D3, D6 & D7.

Primary Examiner—Dave W. Arola
Assistant Examiner—Heather Chun
Attorney, Agent, or Firm—Toren, McGeady & Associates

[57] ABSTRACT

The invention relates to a threaded swivel connector (1) for connecting a housing (3) to a member (2) by means of a hollow bolt (7). For improving the sealing effect, there have been provided specially designed sealing edges (15) of a collar (8) of the bolt (7) to seal with the housing (3) and sealing edges (21, 25) of a sealing ring (18) between the housing (3) and the member (2) to be connected. The sealing edges (15, 21, 25) are formed between inclined annular faces (16, 17, 19, 20, 22, 23), one at an acute angle to a plane (E1, E2, E3) at right angles to said axis and the other oppositely inclined at a greater angle.

12 Claims, 4 Drawing Sheets

THREADED SWIVEL CONNECTOR

BACKGROUND OF THE INVENTION

1. Field of the Invention

This invention is concerned with a directionally adjustable threaded swivel connector comprising a housing, comprising a connecting branch, and a hollow bolt which enters the housing at right angles to the branch, the bolt comprising a collar which at least partially covers one end face of the housing and can be brought into sealing engagement therewith by means of a sealing edge, the bolt also comprising a threaded end projecting from the housing and screwable into a threaded bore in a member to which a connection is to be made, and a sealing ring, which seals by means of sealing edges, inserted between an end face of the housing and a contact surface of said member.

Current threaded swivel connectors have the disadvantage that the sealing effect is not suitable for threaded high-pressure connections.

SUMMARY OF THE INVENTION

It is the object of the present invention to improve the threaded swivel connector in such a way that it can also be used for a threaded high-pressure connection, i.e. that the sealing effect of the components participating in the seal is improved to such an extent that even at high internal pressures a good sealing effect is maintained, without any leakages occurring.

The invention provides a directionally adjustable threaded swivel connector comprising a housing, comprising a connecting branch, and a hollow bolt which enters the housing at right angles to the branch, the bolt comprising a collar which at least partially covers one end face of the housing and can be brought into sealing engagement therewith by means of a sealing edge, the bolt also comprising a threaded end projecting from the housing and screwable into a threaded bore in a member to which a connection is to be made, and a sealing ring, which seals by means of sealing edges, inserted between an end face of the housing and a contact surface of said member, wherein at least one of the sealing edges of the collar and the sealing ring is formed by two inclined annular faces, the annular face which is closest to a longitudinal axis of the bolt intersecting an imaginary plane extending at right angles to said axis at an acute angle and the other annular face being oppositely inclined and intersecting said imaginary plane at a greater angle.

By designing the edges as sealing edges and by selecting suitable angles it is possible to achieve a cutting-in effect and radial support, with the latter being particularly important in the region of the sealing ring as it prevents the sealing ring from being pressed outwardly under the internal pressure, i.e. the sealing ring and the hollow bolt are radially supported relative to the housing and the member to which a connection is made. This advantage is particularly noteworthy as especially in the region of the connection to the connected member there is little radial space for giving the sealing ring a strength sufficient to prevent it from escaping. Furthermore, due to the slight inclination of the first annular face, the depth of penetration is limited.

In a further embodiment it is proposed that the angle at which the annular face which is closest to said axis intersects said imaginary plane is between 4 degrees and 12 degrees, especially substantially 8 degrees. An angle of 8 degrees has proved to be particularly advantageous because it achieves excellent sealing as a result of the cutting-in effect.

Particularly advantageous support conditions and a particularly advantageous shape of the sealing edge in cooperation with the first annular face is achieved if the angle at which said other annular face intersects said imaginary plane is between 45 degrees and 90 degrees, and especially if it amounts to substantially 50 degrees.

The sealing behaviour of all sealing edges participating in the seal is particularly advantageous if the sealing edges of the collar and of the sealing ring are of similar construction, each having its inclined annular face which is closest to said axis intersecting an imaginary plane at right angles to said axis at the same angle.

According to a further embodiment of the invention, the sealing edges of the sealing ring have the same diameter. In this way, the sealing ring is prevented from being deformed. For both sealing edges, the best possible cutting-in effect is achieved.

According to a preferred embodiment all sealing edges have the same diameter.

In a further embodiment, it is proposed that a resilient seal is accommodated in an annular groove in the bolt, one side of the groove being formed by an inclined annular face of the cutting edge of the collar. By inserting the resilient seal the sealing effect is improved further.

It is further proposed that the sealing ring should comprise a central, radially inwardly extending annular projection whose thickness is less than that of the sealing ring measured across its sealing edges. This measure further improves the stiffness of the sealing ring in the radial direction.

According to a further proposal, the annular projection has been designed to form holding means and a seat face for a resilient double sealing ring with two sealing portions, one effective between the housing and the ring and the other effective between the ring and said member to which a connection is to be made. The two sealing portions may be connected to each other by a web. In consequence, they are connected to the sealing ring in such a way that they cannot get lost.

In order to prevent the sealing ring from being damaged or incorrectly inserted relative to the housing prior to assembly, it is proposed in a further embodiment of the invention that the housing should be provided with circumferentially distributed projections which project towards said member and hold the sealing ring in position. As the cross-section of the housing has the shape of a square, the projections are obtained when producing the end face whose diameter is smaller than the diagonal of the housing.

In a further embodiment, at least one of the sealing edges has a further concentric sealing edge associated therewith.

BRIEF DESCRIPTION OF THE DRAWINGS

Preferred embodiments of the invention are diagrammatically illustrated by way of example in the drawings in which.

DESCRIPTION OF PREFERRED EMBODIMENTS

Figure 1:
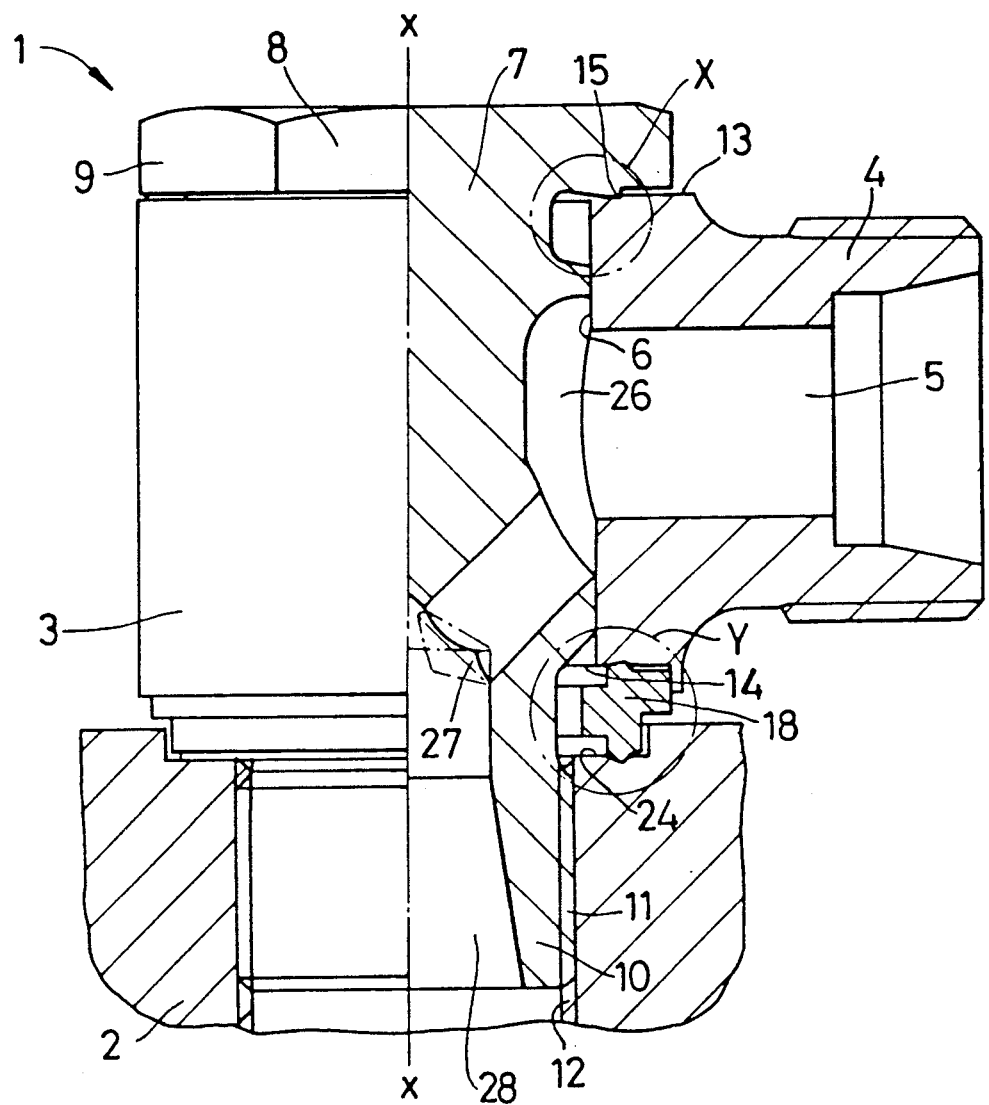
FIG. 1 is a side view partly in section through a threaded swivel connector inserted into a member to be connected.

FIG. 1 shows a directionally adjustable threaded swivel connector 1 in the screwed-in condition relative to a member 2 to be connected. The threaded swivel connector 1 comprises a housing 3 provided with a connecting branch 4 which is integral with the housing 3. The connecting branch 4 extends at right angles relative to the axis x—x of a hollow bolt 7 which penetrates the housing 3. The hollow bolt 7, thus, enters the housing 3 at right angles to the branch 4. The cross-section of the outside of the housing 3 has the shape of a square. The connecting branch 4 has been provided with an external thread to which a pipeline may be connected. The connecting branch 4 comprises a bore 5 which opens. out into an annular channel 26 formed by a bore 6 of the housing 3 in which the bolt 7 is received and by a recess in the hollow bolt 7. The hollow bolt 7 further comprises three circumferentially distributed bores 27 which open into a central bore 28, connecting the annular channel 26 thereto. This central bore 28 provides a pressure agent connection to the connected member 2 or rather a threaded connecting bore 12 thereof. The hollow bolt 7 also comprises a collar 8 which at least partially covers one end face 13 of the housing 3, the face at the opposite end of the housing 3 to the member 2, and can be brought into sealing engagement with the end face 13 of the housing 3 by means of a sealing edge 15.

The hollow bolt 7 also comprises a threaded screwing-in end 10 projecting from the housing 3 and which, by means of a thread 11, is screwable into the threaded bore 12 of the connected member 2. The connector 1 also comprises a sealing ring 18, which seals by means of sealing edges 21 and 25, inserted between an end face 14 of the housing 3 and a contact face 24 of the connected member 2. The sealing ring 18 will be described with reference to the subsequent figures. The sealing ring 18 is pressed against the respective contact faces 14 and 24 by tightening more or less severely the hollow bolt 7 which in the process enters the threaded bore 12 of the connected member 2. For this purpose, the collar 8 has been provided with key faces 9. Threaded swivel connectors serve to establish right angle connections between a pipeline and a member to be connected. If the connection is tight, an angular adjustment is no longer possible, i.e. the housing 3 can no longer be turned relative to the member 2.

For such a threaded swivel connector it is particularly important to achieve the necessary sealing effect. For this purpose, the collar 8, with its sealing edge 15, rests tightly against the end face 13 of the housing 3 at the collar end, as described in connection with FIGS. 2 and 2a. The special design of the sealing ring 18 and its contact with the end face 14 of the housing 3 at the connected member end and with the contact face 24 of the connected member 2 is described in more detail with reference to FIGS. 3 to 6.

Figure 2:
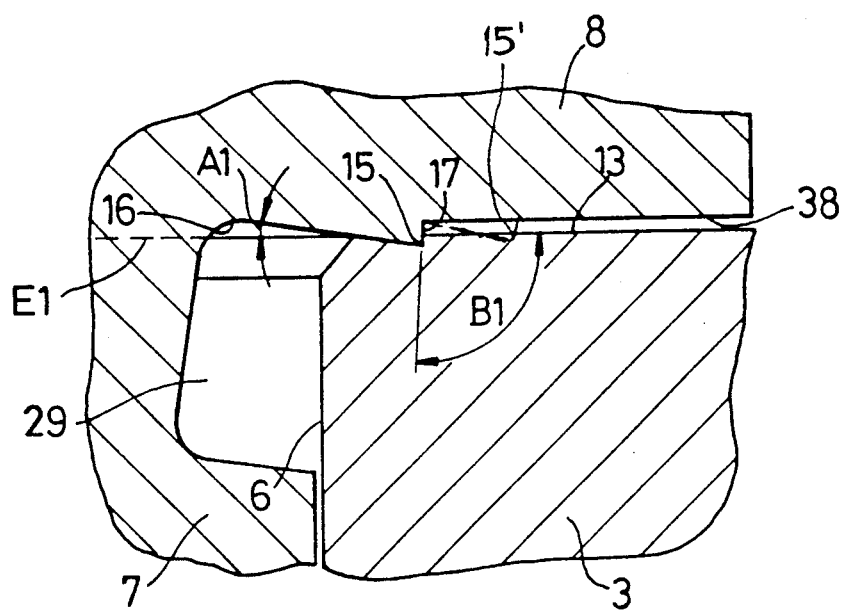
FIG. 2 is a detailed view of the portion X of FIG. 1 showing the sealing edge contact in the region between the collar of the hollow bolt and the housing.
Figure 2A:
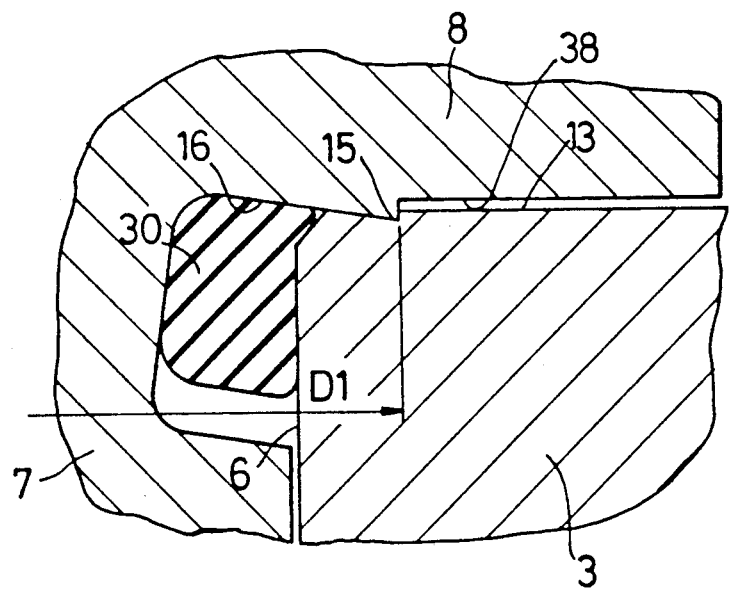
FIG. 2a corresponds to the illustration of FIG. 2, but shows an additionally inserted sealing ring.

As can be seen in FIGS. 2 and 2a, the face 38 of the collar 8 of the hollow bolt 7 facing the end face 13 of the housing 3 at the collar end has been provided with the sealing edge 15. The sealing edge 15 occurs at the point of intersection of two inclined faces 16 and 17 which are inclined relative to each other in opposite directions. The annular face 16 which is closest to the longitudinal axis x—x of the bolt 7 intersects an imaginary plane E1 extending at right angles to said axis at an acute angle A1 which is between 4 degrees and 12 degrees, specifically 8 degrees. The other annular face 17 is oppositely inclined, i.e. inclines in an opposite direction to the plane E1, and intersects the plane E1 at an angle B1 which is greater than the angle A1, being between 45 degrees and 90 degrees, specifically substantially 90 degrees. When tightening the hollow bolt 7, the sealing edge 15 cuts into the surface of the end face 13. The slight incline of the first annular face 16 ensures that on the one hand, the cutting-in process is limited but that, on the other hand, it achieves a sufficiently satisfactory sealing effect. The steeper incline of the annular face 17 ensures that the housing 3 remains aligned relative to the hollow bolt 7 and that it cannot move radially under the pressure. The cutting-in process is also limited by the surface 38 of the collar of the hollow bolt 7 which comes to rest against the end face 13 of the housing 3. Furthermore, the hollow bolt 7 has been provided with an annular groove 29 which comprises a side face formed by the annular face 16 in which is accommodated a resilient elastomer seal 30, as can be seen in FIG. 2a, thereby providing an additional seal in case the sealing effect of the sealing edge 15 is to be improved further. The diameter of the annular sealing edge 15 has been given the reference D1.

Figure 3:
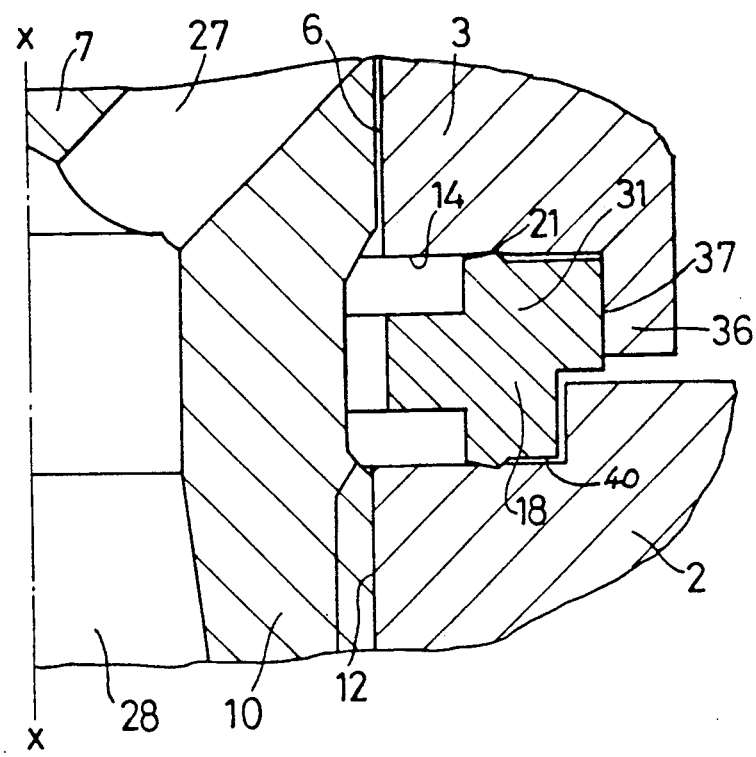
FIG. 3 is a detailed view of the portion Y of FIG. 1 showing the arrangement of the sealing ring between the housing and member to be connected.
Figure 3A:
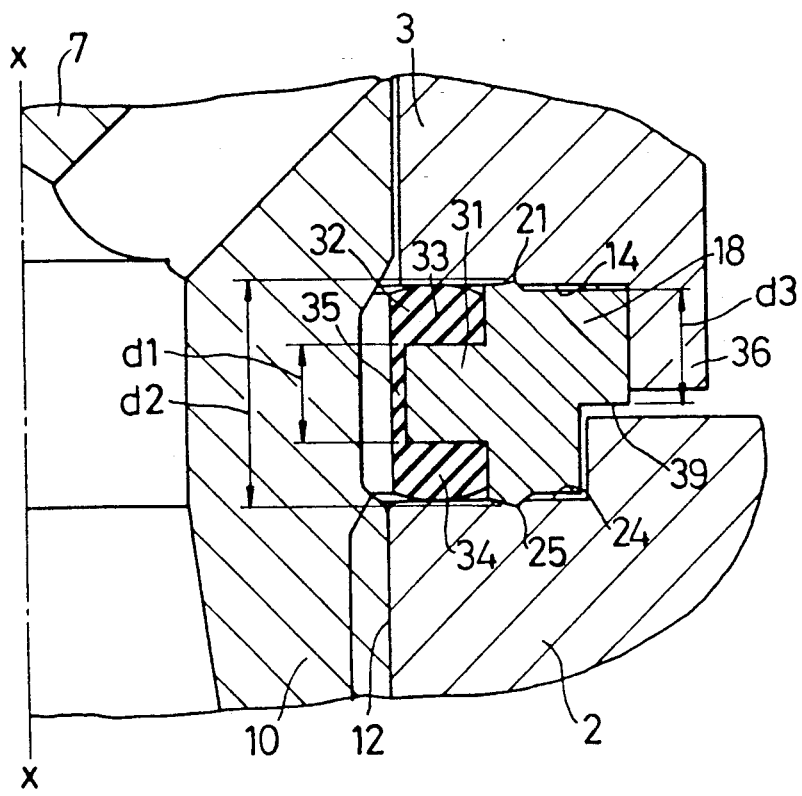
FIG. 3a corresponds to the illustration of FIG. 3, but shows an additional double seal.
Figure 4:
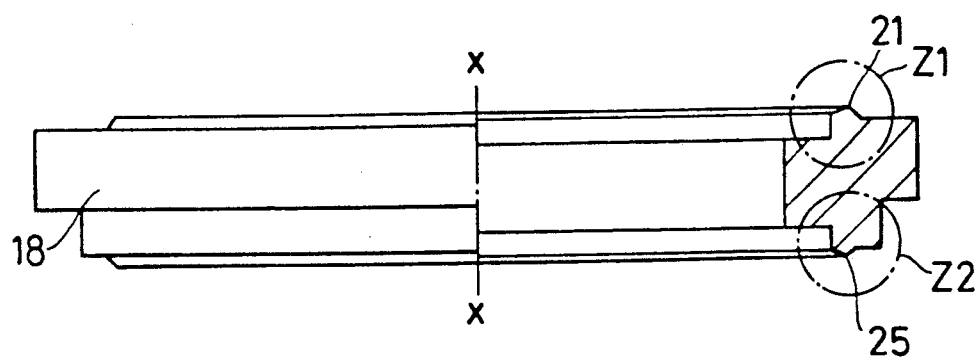
FIG. 4 is a side view partly in section of the sealing ring.
Figure 5:
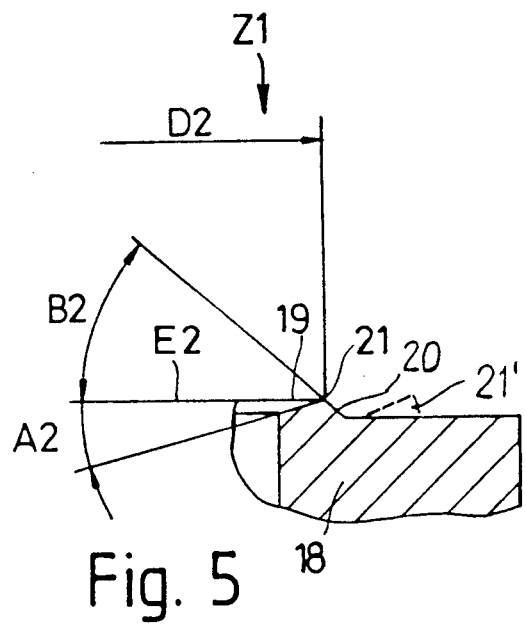
FIG. 5 is a detailed view of the portion Z1 of FIG. 4 showing the sealing edge design at the housing end.
Figure 6:
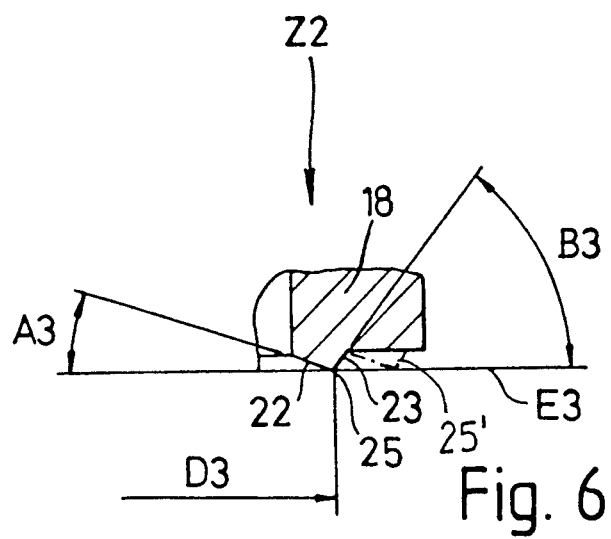
FIG. 6 is a detailed view of the portion Z2 of FIG. 4 showing the sealing edge design at the connected member end.

FIGS. 3 and 3a show the arrangement of the sealing ring 18 relative to the housing 3 and the connected member 2, while FIGS. 4 to 6 illustrate the design of the sealing ring 18 itself. First, reference is made to FIGS. 4 to 6 and the design of the sealing ring 18. At each of its two end faces the sealing ring 18 is provided with a sealing edge 21 and 25 respectively. The sealing edge 21 is associated with the end face 14 of the housing 3 and the sealing edge 25 with the contact face 24 at the connected member end. FIG. 5 shows a detail regarding the sealing edge 21. It is also formed at the point of intersection of a first annular face 19 and a second annular face 20. The first annular face 19 which is closer to the axis x—x than is the second annular face 20 extends at an angle A2 of 8 degrees relative to an imaginary plane E2 extending at right angles relative to the axis x—x. The second annular face 20 is inclined in the direction opposite to the first annular face 19 and extends at an angle B2 of substantially 50 degrees relative to the plane E2. The sealing edge 21 designed as an annular edge has a diameter D2. The details of the sealing edge 25 at the connected member end are given in FIG. 6. It is also formed by a first annular face 22 and a second annular face 23. The first annular face 22 extends at an angle A3 of 8 degrees relative to an imaginary plane E3 arranged at right angles relative to the axis x—x, whereas the second annular face 23, relative to the same plane E3, extends at an opposed angle B3 of 50 degrees thereto. The sealing edge 25 is arranged on the diameter D3.

The two sealing edges 21 and 25 preferably have diameters D2 and D3 of equal size. Thus, the sealing edges 15, 21 and 25 of the collar 8 and the sealing ring 18 are of similar construction, each having its inclined annular face 16, 19 and 22 which is closest to the axis x—x intersecting an imaginary plane at right angles to said axis at the same angle, i.e. 8 degrees. Preferably, the sealing edge 15 of the collar 8 has a diameter D1 of the same size as the diameters of the two other sealing edges 21 and 25 of the sealing ring 18. The sealing ring 18 is preferably surface-hardened. FIGS. 3 and 3a also show that the sealing ring 18 has been provided with a radially inwardly extending projection 31 which provides radial reinforcement for the sealing ring 18 to prevent it from escaping radially. Above all, however, by arranging the second annular faces 20 and 23 at a larger angle, i.e. with a steeper incline a sufficiently high resistance against radial deformation of the sealing ring 18 under the effect of internal pressure is ensured. If the sealing effect is to be improved further, it is possible to provide a double sealing ring 32 of resilient material. The projection 31 provides holding means and a seat face for the sealing ring 32 which comprises two sealing portions 33 and 34 connected to each other by a web 35. The two sealing portions 33, 34 are arranged on the annular projection 31 whose axial thickness d1 is smaller than the thickness d2 of the ring 18, measured across the sealing edges 21 and 25. The two sealing portions 33 and 34 are supported on the axial limiting faces of the annular projection 31 on the one hand and on the end face 14 and the contact face 24 on the other hand. Connecting the two sealing portions 33 and 34 by a web 35 ensures that the sealing ring 18 cannot lose the seal 32.

The sealing ring 18, with its outer face 37, is received between circumferentially distributed projections 36 of the housing 3 which project towards the member 2 and hold the ring 18 in position. These projections are obtained as a result of the special design of the cross-section of the housing 3 by recessing the end face 14 with a diameter which is smaller than the diagonal of the square cross-section of the housing 3. If necessary, the projections 36 may be deformed radially inwardly to ensure that the sealing ring 18 remains aligned relative to the housing 3 and to prevent an uneven cutting-in effect when tightening the hollow bolt 7.

Furthermore, the sealing ring 18, in its diameter region facing the housing 3 and received between the projections 36, is increased radially outwardly by a diameter projection having a lower surface 39 in order to increase radial stiffness. In addition, for limiting the cutting-in effect, there has been provided a return face 40 which may come to rest against the contact faces opposite. The faces 39 project a distance d3 which is greater than the projection of the projections 36.

If necessary, the sealing edges 15, 21 and 25 may have a further concentric sealing edge (15', 21' and 25') associated therewith.

We claim:

1. A directionally adjustable threaded swivel connector comprising a housing, comprising a connecting branch, and a hollow bolt which enters the housing at right angles to the branch, the bolt comprising a collar which at least partially covers one end face of the housing and can be brought into sealing engagement therewith by means of a sealing edge, the bolt also comprising a threaded end projecting from the housing and screwable into a threaded bore in a member to which a connection is to be made, and a sealing ring, which seals by means of sealing edges, inserted between an end face of the housing and a contact surface of said member, wherein at least one of the sealing edges of the collar and the sealing ring is formed by two inclined annular faces, the annular face which is closest to a longitudinal axis of the bolt intersecting an imaginary plane extending at right angles to said axis at an acute angle between 4 degrees and 12 degrees and the other annular face being oppositely inclined and intersecting said imaginary plane at a great angle.

2. A threaded swivel connector according to claim 1, wherein the angle at which the annular face which is closest to said axis intersects said imaginary plane is substantially 8 degrees.

3. A threaded swivel connector according to claim 1, wherein the angle at which said other annular face intersects said imaginary plane is between 45 degrees and 90 degrees.

4. A threaded swivel connector according to claim 3, wherein the angle at which said other annular face intersects said imaginary plane is substantially 50 degrees.

5. A threaded swivel connector according to claim 1, wherein the sealing edges of the collar and of the sealing ring are of similar construction, each having its inclined annular face which is closest to said axis intersecting an imaginary plane at right angles to said axis at the same angle.

6. A threaded swivel connector according to claim 1, wherein the sealing edges of the sealing ring have the same diameter.

7. A threaded swivel connector according to claim 1, wherein all the sealing edges of the connector have the same diameter.

8. A threaded swivel connector according to claim 1, wherein a resilient seal is accommodated in an annular groove in the bolt, one side of the groove being formed by an inclined annular face of the cutting edge of the collar.

9. A threaded swivel connector according to claim 1, wherein the sealing ring comprises a central, radially inwardly extending annular projection whose thickness is less than that of the sealing ring measured across its sealing edges.

10. A threaded swivel connector according to claim 9, wherein the projection provides holding means and a seat face for a resilient double sealing ring with two sealing portions, one effective between the housing and the ring and the other effective between the ring and said member.

11. A threaded swivel connector according to claim 1, wherein the housing is provided with circumferentially distributed projections which project towards said member and hold the seal ring in position.

12. A thread swivel connector according to claim 1, wherein at least one of the sealing edge of the collar and the sealing edges of the sealing ring has a further concentric sealing edge associated therewith.

* * * * *

UNITED STATES PATENT AND TRADEMARK OFFICE
CERTIFICATE OF CORRECTION

PATENT NO. : 5,052,724

DATED : October 1, 1991

INVENTOR(S) : Mathias Konrad and Arnold Barth

It is certified that error appears in the above-identified patent and that said Letters Patent is hereby corrected as shown below:

On title page, item

[73] Assignee: Jean Walterscheid GmbH

Fed. Rep. of Germany

Signed and Sealed this

Ninth Day of March, 1993

Attest:

STEPHEN G. KUNIN

*Attesting Officer*  Acting Commissioner of Patents and Trademarks